United States Patent
Wu et al.

(10) Patent No.: US 7,319,355 B2
(45) Date of Patent: Jan. 15, 2008

(54) PULSE GENERATOR

(75) Inventors: Jui-Jen Wu, Hsinchu (TW);
Yung-Lung Lin, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 4 days.

(21) Appl. No.: 11/324,472

(22) Filed: Jan. 3, 2006

(65) Prior Publication Data
US 2007/0152726 A1 Jul. 5, 2007

(51) Int. Cl.
G06F 1/04 (2006.01)
(52) U.S. Cl. .................... 327/291; 327/172
(58) Field of Classification Search ............ None
See application file for complete search history.

(56) References Cited

U.S. PATENT DOCUMENTS

| | | | | | |
|---|---|---|---|---|---|
| 4,870,971 | A | * | 10/1989 | Russell et al. | 600/447 |
| 4,994,687 | A | * | 2/1991 | Fujii et al. | 327/227 |
| 5,723,993 | A | * | 3/1998 | Cha | 327/172 |
| 5,761,151 | A | * | 6/1998 | Hatakeyama | 365/233.5 |
| 5,929,684 | A | * | 7/1999 | Daniel | 327/299 |
| 6,088,255 | A | * | 7/2000 | Matsuzaki et al. | 365/76 |
| 6,269,051 | B1 | * | 7/2001 | Funaba et al. | 365/233 |
| 6,333,656 | B1 | * | 12/2001 | Schober | 327/202 |
| 6,400,202 | B1 | * | 6/2002 | Fifield et al. | 327/291 |
| 6,445,644 | B2 | * | 9/2002 | Sher | 365/233 |
| 6,476,657 | B2 | | 11/2002 | Kuhne | 327/291 |
| 6,721,214 | B2 | * | 4/2004 | Hausmann et al. | 365/194 |
| 7,154,316 | B2 | * | 12/2006 | Park | 327/172 |
| 2003/0236802 | A1 | * | 12/2003 | Epstein | 708/250 |
| 2005/0116756 | A1 | * | 6/2005 | Kim | 327/218 |
| 2005/0134342 | A1 | * | 6/2005 | Lin et al. | 327/174 |

\* cited by examiner

*Primary Examiner*—N. Drew Richards
*Assistant Examiner*—Cassandra Cox
(74) *Attorney, Agent, or Firm*—K & L Gates LLP

(57) ABSTRACT

A system for generating a pulse signal in response to a clock signal includes a latch module for generating a latched output in response to a leading edge of the clock signal. A delay module is coupled to the latch module for delaying the latched output. A first logic device having a first input terminal coupled to the latch module and a second input terminal is coupled to the delay module for generating the pulse signal, which has a pulse width determined by a delay time of the latched output passing through the delay module. The pulse signal is coupled to the latch module for resetting the latch module when the pulse signal is not asserted.

19 Claims, 5 Drawing Sheets

PULSE GENERATOR

BACKGROUND

The present invention relates generally to integrated circuit (IC) designs, and more particularly to a circuit for generating a pulse signal in response to an input clock signal.

A pulse generator is commonly used within an integrated circuit (IC) for providing a pulse signal with a constant pulse width. A conventional pulse generator is designed to generate the pulse signal in response to an input clock signal. The pulse generator typically includes an NAND gate device with one input terminal coupled to the input clock signal without delayed, and the other input terminal coupled to the input clock signal delayed in time. The NAND gate device generates an output that goes high when both the clock signal and the delayed clock signal are high. The output of the NAND gate device is inverted to generate the pulse signal.

Conventionally, the pulse width of the pulse signal is designed to be determined by the delay time of the clock signal passing through the delay module. However, this may not be true if the width of the clock signal is too short. As discussed above, the pulse signal is generated when both the clock signal and the delayed clock signal are at high states. If the high state of the clock is shorter than the high state of the delayed clock, it will cut short the pulse width of the pulse signal, and therefore increasing the risk of system error.

While some other pulse generators have been proposed to solve the problem caused by the insufficient clock width, they often have their own drawbacks and therefore present a separate set of challenges. Thus, it is desirable to design a new pulse generator that can generate the pulse signal, which is not cut short by the insufficient clock width.

SUMMARY

The present invention discloses a system for generating a pulse signal in response to a clock signal. The system includes a latch module for generating a latched output in response to a leading edge of the clock signal. A delay module is coupled to the latch module for delaying the latched output. A first logic device having a first input terminal coupled to the latch module and a second input terminal is coupled to the delay module for generating the pulse signal, which has a pulse width determined by a delay time of the latched output passing through the delay module. The pulse signal is coupled to the latch module for resetting the latch module when the pulse signal is not asserted.

The construction and method of operation of the invention, however, together with additional objectives and advantages thereof will be best understood from the following description of specific embodiments when read in connection with the accompanying drawings.

DESCRIPTION

Figure 1A:
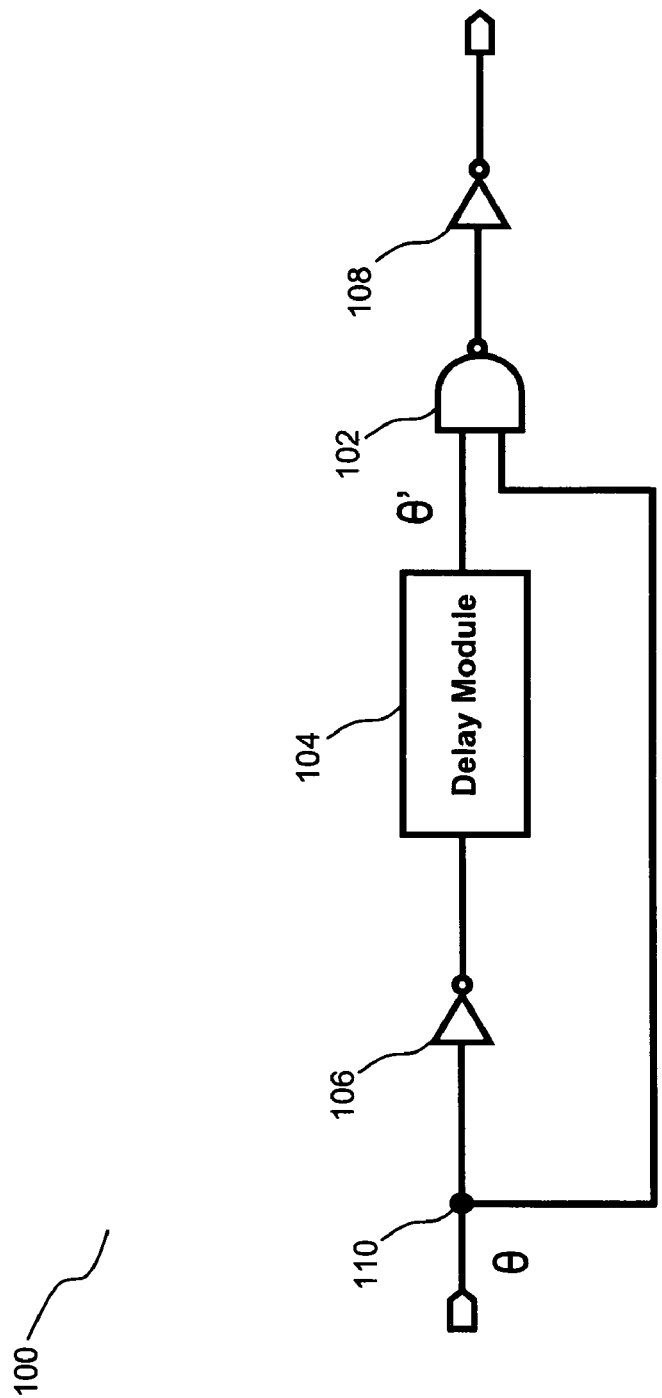
FIG. 1A schematically illustrates a conventional pulse generator.

FIG. 1A illustrates a conventional pulse generator 100 where a pulse signal is generated by inverting the output of an NAND gate device 102 that receives an input signal $\theta$ and a delayed inversed input signal $\theta'$. The pulse generator 100 includes the NAND gate device 102, a delay module 104, and two inverters 106 and 108. The signal $\theta$ is the external clock signal provided at a node 110. The signal $\theta'$ is the signal after the signal $\theta$ is inverted by the inverter 106 and delayed by the delay module 104. The two signals $\theta$ and $\theta'$ are combined together by the NAND gate device 102 to provide an output, which is further inverted by the inverter 108 to generate the pulse signal.

Figure 1B:
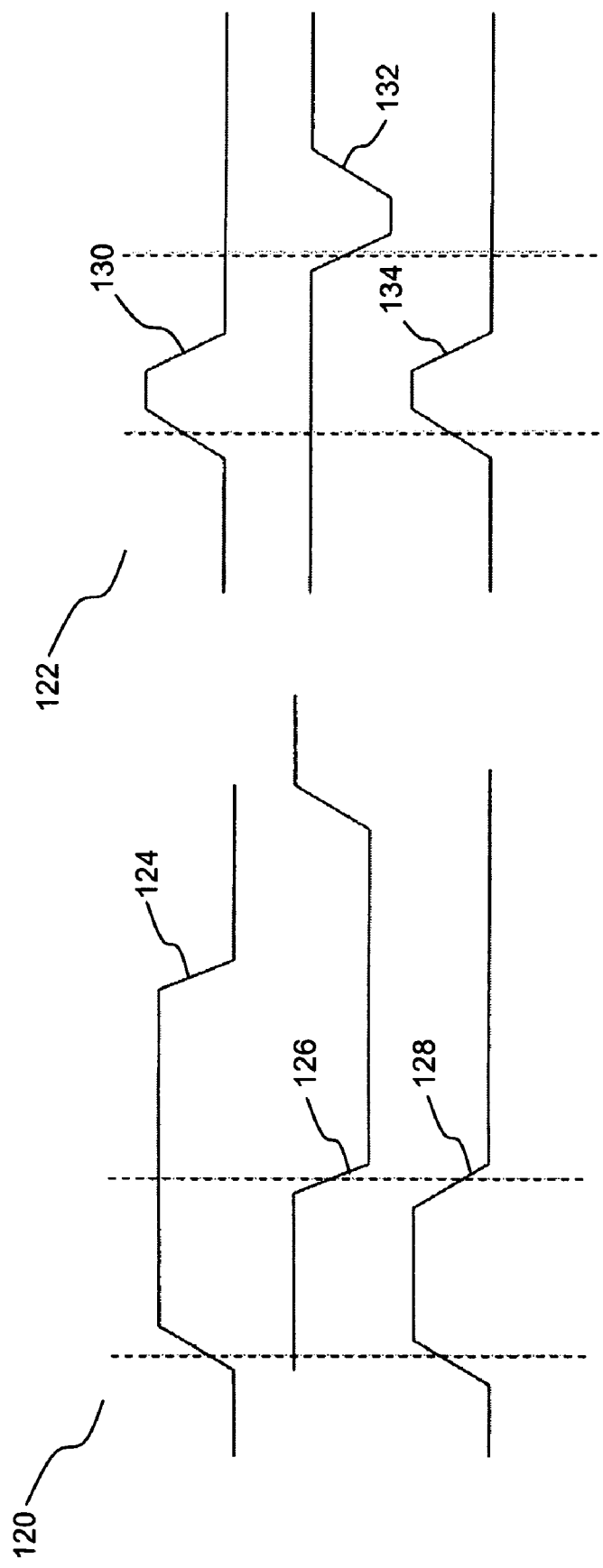
FIG. 1B illustrates exemplary timing diagrams for the conventional pulse generator.

FIG. 1B illustrates two exemplar timing diagrams 120 and 122 for the conventional pulse generator 100 shown in FIG. 1A. Referring simultaneously to FIGS. 1A and 1B, in the timing diagram 120, a signal 124 represents an input clock, and a signal 126 represents the same clock signal after going through the inverter 106 and the delay module 104. Both signals 124 and 126 are sent to the two input terminals of the NAND gate device 102. A signal 128 represents the pulse signal output from inverter 108. As shown in the diagram 120, the width of the signal 128 is equal to the overlap between the high states of both the signals 124 and 126.

In the timing diagram 122, a signal 130 represents an input clock signal, and a signal 132 represents the same clock signal after going through the inverter 106 and the delay module 104. Both signals 130 and 132 are sent to the two input terminals of the NAND gate 102. A signal 134 represents the pulse signal output from inverter 108. Here, the width of the signal 130 is shorter than that of the signal 132, thereby cutting short the pulse width of the signal 134. As shown in the figure, the width of the pulse 134 is shorter than its predefined value which should have been controlled by the signal 132. Thus, the pulse width of the signal 134 may be shorter than what the specifications require. This, in turn, may cause the pulse generator 100 to fail.

Figure 2:
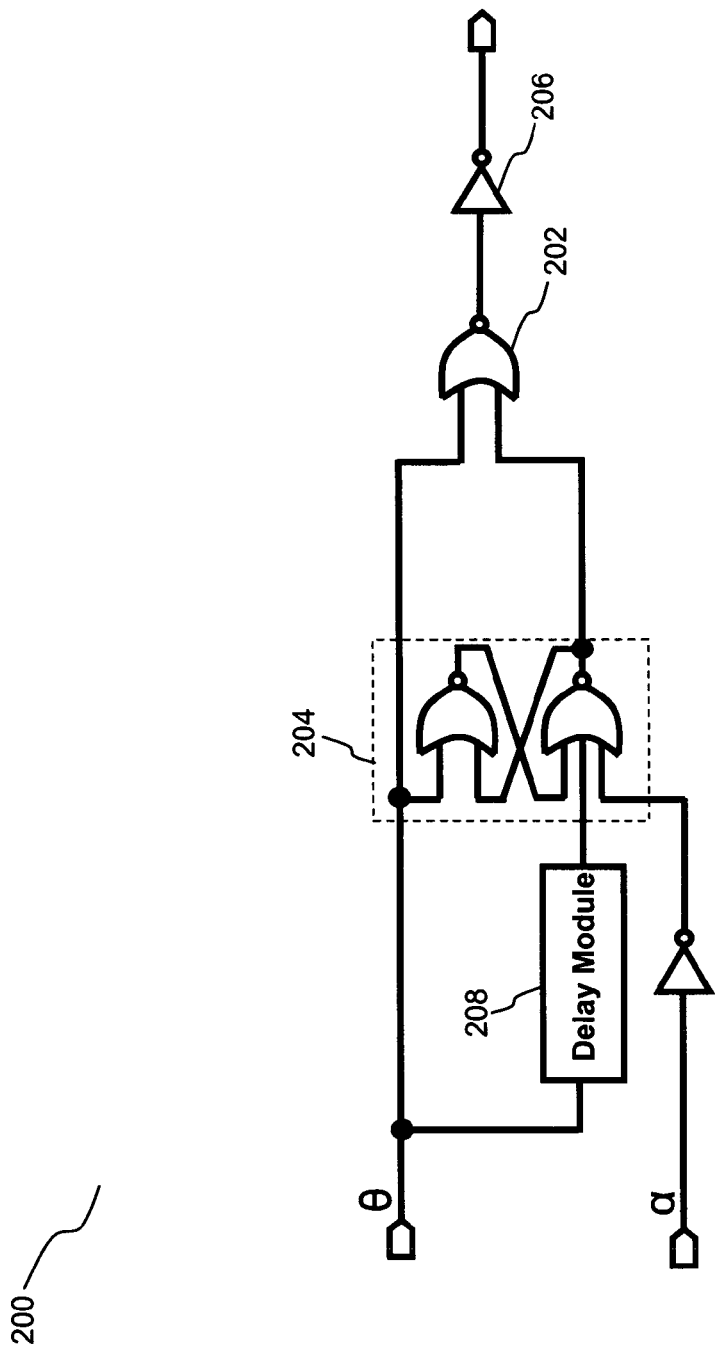
FIG. 2 schematically illustrates another conventional pulse generator.

FIG. 2 illustrates another conventional pulse generator 200 where a pulse signal is generated by inverting the output signal of an NOR gate device 202 in response to an input clock signal $\theta$. The NOR gate device 202 has a first input terminal, a second input terminal, and an output terminal. An inverter 206 is connected to the output terminal of the NOR gate 202. The first input terminal of the NOR gate device 202 is connected directly to the clock signal $\theta$. A delay module 208 is coupled between the clock signal $\theta$ and a latch module 204, which is further coupled to the second input terminal of the NOR gate device 202.

While the pulse generator 200 is able to generate a pulse signal that is not cut short by an insufficient clock width, it suffers from signal fighting issues. For example, in an initial situation where the input clock $\theta$ is low and the generated pulse signal is high, the value latched by the latch module 204 would be "1." The latched value "1" prevents the pulse generator 200 from properly responding to a change of state for the clock signal $\theta$. Thus, a resetting signal a is required to reset the latch module 204 when the pulse signal is not asserted. This not only complicates the design of the pulse generator 200, but also induces signal fighting issues between the clock signal $\theta$ and the resetting signal $\alpha$.

Figure 3:
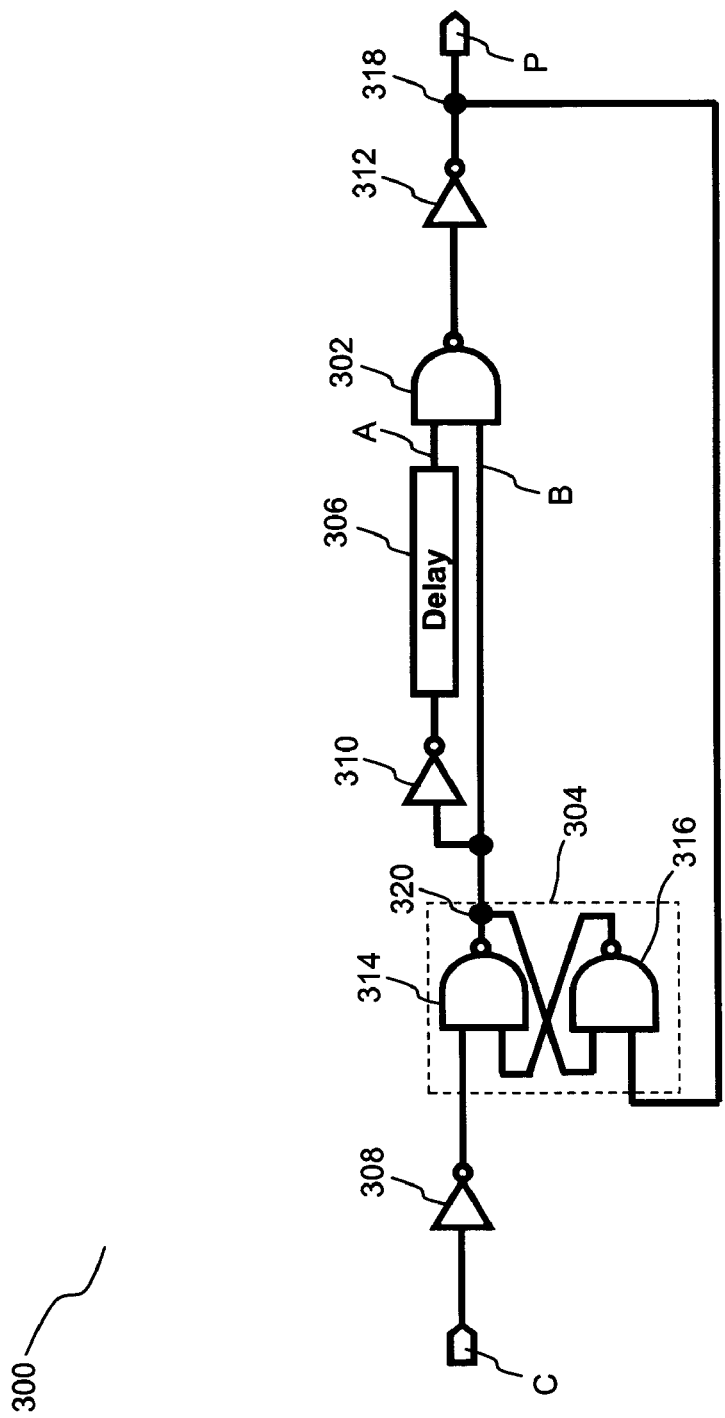
FIG. 3 schematically illustrates a pulse generator in accordance with one embodiment of the present invention.

FIG. 3 illustrates a pulse generator 300 in accordance with one embodiment of the present invention. The pulse generator 300 includes a logic device, such as a NAND gate device 302, a latch module 304, a delay module 306, and three inverters 308, 310, and 312. An external clock signal enters the pulse generator 300 by first traveling through the inverter 308 into the latch module 304. The latch module 304 includes two NAND gate devices 314 and 316 cross-coupled with each other. The latch module 304 is configured to have two input terminals and one output terminal. The first input terminal of the latch module 304 is coupled to output of the inverter 308, while its second input terminal is tied to an output node 318 of the pulse generator 300 to create a feedback loop. The output terminal of the latch module 304 outputs a latched output signal to a node 320, which is further coupled to the NAND gate device 302 and the inverter 310. The NAND gate device 302 receives two input signals: a latched output signal directly from the latch module 304 and a delayed latched output signal from the node 320 after going through the inverter 310 and the delay module 306. The two signals are combined together by the NAND gate 302 to generate an output, which is further inverted by the inverter 312 to generate a pulse signal.

Figure 4:
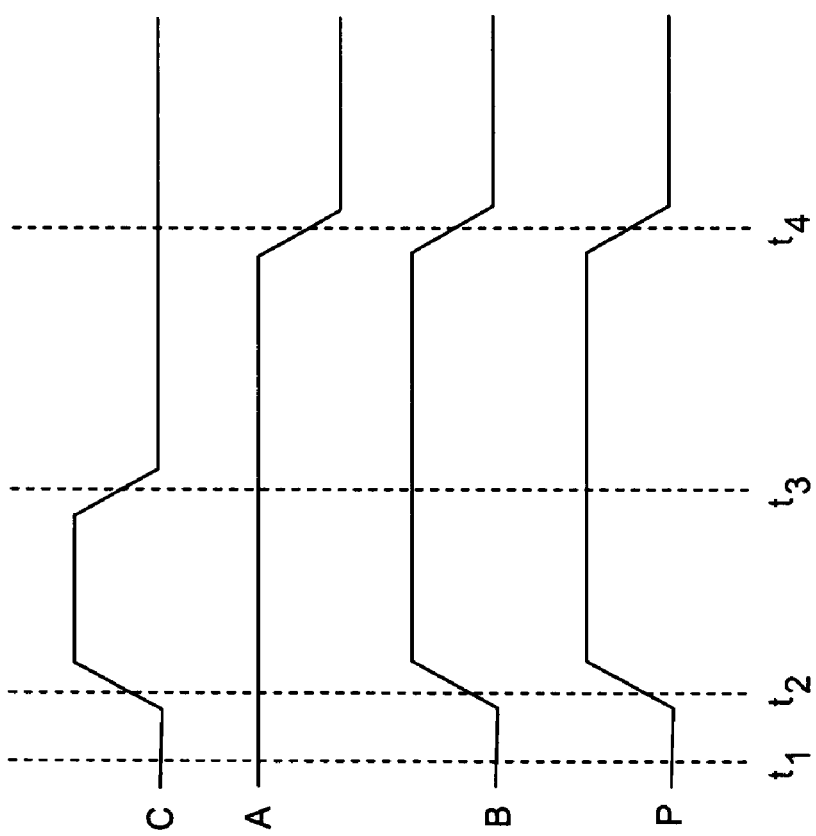
FIG. 4 illustrates an exemplary timing diagram for the proposed pulse generator in accordance with one embodiment of the present invention.

FIG. 4 illustrates a timing diagram for explaining the operation of the pulse generator 300 shown in FIG. 3. Simultaneously referring to FIGS. 3 and 4, signal C represents the external clock signal received by the inverter 308. Signal P represents the pulse signal at the node 318. Signals A and B represent the signals at the two input terminals of the NAND gate device 302, respectively. At time t1, the signals C and P are set to "0." This causes the NAND gate device 316 to generate a "1" and the NAND gate device 314 to generate a "0." Thus, the signal B is at "0" and signal A is at "1." At time t2, the leading edge of signal C triggers the latch module 320 to store a "0," thereby causing the signal B to go high. Due to the delay module 306, the signal A remains high at this moment, thereby causing the signal P to go high in response to the leading edge of signal C. At time t3, the signal C goes low, while the signal A still remains high because of the delay module 306, and the signal B also remains high because of the "0" stored in the latch module 304. As a result, the signal P remains high at this moment. At time t4, the signal A finally goes low. This cause the output of the NAND gate device 302 to go high and the output of the inverter 312 (signal P) goes low. This, in turn, flips the value stored in the latch module 320 to "1," thereby causing the signal B to go low.

As shown in FIG. 4, while the pulse signal (signal P) is triggered by the leading edge of clock signal (signal C), its pulse width (the period between t3 and t4) is determined by the leading edge of the delayed latched output (signal A). The time between the leading edge of signal C and the leading edge of signal A can be determined by the delay module 306. For example, the delay module 306 can be a string of serially connected inverters, and the time between the leading edges of signals C and A can be determined by the number of the inverters. As such, the pulse generator 300 allows the pulse width of the pulse signal to be free from the influence of the external clock, i.e., signal A. This helps the pulse generator 300 to avoid undesired failures caused by insufficient clock width.

Moreover, when signal P is not asserted, it resets the value stored in the latch module 320. This eliminates the need of an additional resetting signal for the latch module 304, thereby avoiding the signal fighting issue between the external clock signal and the resetting signal for the conventional pulse generator shown in FIG. 2.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A system for generating a pulse signal in response to a clock signal, comprising:
   a latch module for generating a latched output in response to a leading edge of the clock signal;
   a delay module coupled to the latch module for delaying the latched output; and
   a first logic device having a first input terminal coupled to the latch module and a second input terminal coupled to the delay module for generating the pulse signal, which has a pulse width determined by a delay time of the latched output passing through the delay module,
   wherein the pulse signal is directly coupled to the latch module without any intermediate circuit module interposed there between for resetting the latch module when the pulse signal is not asserted.

2. The system of claim 1 further comprising a first inverter coupled between the clock signal and the latch module.

3. The system of claim 2 wherein the latch module comprises a first NAND gate device having a first input terminal, a second input terminal and an output terminal, the first input terminal of the first NAND gate device being coupled to an output terminal of the first inverter, and the output terminal of first NAND gate device being coupled to the first input terminal of the first logic device.

4. The system of claim 3 wherein the latch module comprises a second NAND gate device having a first input terminal, a second input terminal and an output terminal, the first input terminal of the second NAND gate device being coupled to the output terminal of the first NAND gate device, the second input terminal of the second NAND gate device being coupled to the pulse signal, and the output terminal of the second NAND gate device being coupled to the second input terminal of the first NAND gate device.

5. The system of claim 4 further comprising a second inverter coupled between the delay module and the latch module.

6. The system of claim 5 further comprising a third inverter coupled to an output terminal of the first logic device.

7. The system of claim 1 wherein the first logic device is an NAND gate device.

8. The system of claim 1 wherein the delay module comprises a plurality of serially connected inverters.

9. A pulse generator for generating a pulse signal in response to a clock signal, comprising:
   a latch module for generating a latched output in response to a leading edge of the clock signal;
   a first inverter coupled to the latch module for inverting the latched output;

a delay module coupled to first inverter for delaying the inverted latched output; and a first logic device having a first input terminal coupled to the latch module and a second input terminal coupled to the delay module for generating the pulse signal, which has a wavelength determined by a delay time of the inverted latched output passing through the delay module, wherein the pulse signal is directly coupled to the latch module without any intermediate circuit module interposed there between for resetting the latch module when the pulse signal is not asserted.

10. The pulse generator of claim 9 further comprising a second inverter coupled between the clock signal and the latch module.

11. The pulse generator of claim 10 wherein the latch module comprises a first NAND gate device having a first input terminal, a second input terminal and an output terminal, the first input terminal of the first NAND gate device being coupled to an output terminal of the second inverter, and the output terminal of first NAND gate device being coupled to the first input terminal of the first logic device and the first inverter.

12. The pulse generator of claim 11 wherein the latch module comprises a second NAND gate device having a first input terminal, a second input terminal and an output terminal, the first input terminal of the second NAND gate device being coupled to the output terminal of the first NAND gate device, the second input terminal of the second NAND gate device being coupled to the pulse signal, and the output terminal of the second NAND gate device being coupled to the second input terminal of the first NAND gate device.

13. The pulse generator of claim 12 further comprising a third inverter coupled to an output terminal of the first logic device.

14. The pulse generator of claim 9 wherein the first logic device is an NAND gate device.

15. The pulse generator of claim 9 wherein the delay module comprises a plurality of serially connected inverters.

16. A pulse generator for generating a pulse signal in response to a clock signal, comprising:

a latch module having a first NAND gate device cross-coupled with a second NAND gate device crossed for generating a latched output in response to a leading edge of the clock signal;

a first inverter coupled to the latch module for inverting the latched output;

a delay module coupled to first inverter for delaying the inverted latched output;

a third NAND gate device having a first input terminal coupled to the latch module and a second input terminal coupled to the delay module for generating the pulse signal, which has a wavelength determined by a delay time of the inverted latched output passing through the delay module, wherein the pulse signal is coupled to the latch module for resetting the latch module when the pulse signal is not asserted; and a second inverter coupled between the clock signal and the latch module.

17. The pulse generator of claim 16 wherein the first NAND gate device has a first input terminal, a second input terminal and an output terminal, the first input terminal of the first NAND gate device being coupled to an output terminal of the second inverter, and the output terminal of first NAND gate device being coupled to the first input terminal of the third NAND gate device and the first inverter.

18. The pulse generator of claim 17 wherein the second NAND gate device has a first input terminal, a second input terminal and an output terminal, the first input terminal of the second NAND gate device being coupled to the output terminal of the first NAND gate device, the second input terminal of the second NAND gate device being coupled to the pulse signal and the output terminal of the second NAND gate device being coupled to the second input terminal of the first NAND gate device.

19. The pulse generator of claim 18 further comprising a third inverter coupled to an output terminal of the third NAND gate device.

* * * * *